US012800307B2

(12) United States Patent
Bertini et al.

(10) Patent No.: US 12,800,307 B2
(45) Date of Patent: *Nov. 17, 2026

(54) DRIVE AND SENSE BALANCED GYROSCOPE WITH ENHANCED VIBRATION REJECTION

(71) Applicant: Invensense, Inc., San Jose, CA (US)

(72) Inventors: Lorenzo Bertini, Cascina (IT); Damiano Milani, Fontanella (IT); Giacomo Gafforelli, Casatenovo (IT); Luca Coronato, Corsico (IT)

(73) Assignee: InvenSense, Inc., San Jose, CA (US)

( * ) Notice: Subject to any disclaimer, the term of this patent is extended or adjusted under 35 U.S.C. 154(b) by 203 days.

This patent is subject to a terminal disclaimer.

(21) Appl. No.: 18/680,163

(22) Filed: May 31, 2024

(65) Prior Publication Data

US 2025/0146820 A1 May 8, 2025

Related U.S. Application Data

(60) Provisional application No. 63/596,648, filed on Nov. 7, 2023.

(51) Int. Cl.
*G01C 19/5712* (2012.01)

(52) U.S. Cl.
CPC ................................ *G01C 19/5712* (2013.01)

(58) Field of Classification Search
CPC ............ G01C 19/5712; G01C 19/5747; G01C 19/574
See application file for complete search history.

(56) References Cited

U.S. PATENT DOCUMENTS 10,415,968 B2 9/2019 Prikhodko et al.
10,514,259 B2 12/2019 Jia et al.
(Continued)

FOREIGN PATENT DOCUMENTS

EP 4257925 A1 10/2023
TW 201522911 A 6/2015
(Continued)

OTHER PUBLICATIONS

Office Action for Taiwan Application No. 113140482, dated Feb. 11, 2026, 10 Pages.
(Continued)

*Primary Examiner* — Walter L Lindsay, Jr.
*Assistant Examiner* — Andrew V Do
(74) *Attorney, Agent, or Firm* — Van Hoven PC; Joshua Van Hoven

(57) ABSTRACT

A MEMS gyroscope may have first and second drive masses configured to be driven in anti-phase. The gyroscope also includes first and second out-of-plane proof masses coupled to the first and second drive masses, respectively. The first and second out-of-plane proof masses may be driven in anti-phase to each other. The first and second out-of-plane proof masses may each include a driven mass and a sense mass, and may be responsive to an angular velocity about an out-of-plane axis to cause a respective in-plane Coriolis forces perpendicular to their respective drive motions. The gyroscope also includes a coupling link between the sense masses of first and second out-of-plane proof masses, which results in rejection of undesired vibrations.

20 Claims, 13 Drawing Sheets

(56) References Cited

U.S. PATENT DOCUMENTS

| | | | | |
|---|---|---|---|---|
| 10,914,584 | B2 | 2/2021 | Senkal et al. | |
| 11,118,907 | B2 | 9/2021 | Senkal et al. | |
| 11,193,771 | B1 * | 12/2021 | Gregory | G01C 19/5712 |
| 2014/0373628 | A1 | 12/2014 | Balslink et al. | |
| 2018/0172447 | A1 | 6/2018 | Prikhodko et al. | |
| 2021/0381834 | A1 | 12/2021 | Gregory et al. | |
| 2022/0057210 | A1 | 2/2022 | Gregory et al. | |
| 2023/0057613 | A1 | 2/2023 | Endean | |

FOREIGN PATENT DOCUMENTS

| | | | |
|---|---|---|---|
| TW | 201706566 | A | 2/2017 |
| TW | 201836967 | A | 10/2018 |

OTHER PUBLICATIONS

International Search Report and Written Opinion for Application No. PCT/US2024/054616 dated May 12, 2025 (14 pages).

* cited by examiner

DRIVE AND SENSE BALANCED GYROSCOPE WITH ENHANCED VIBRATION REJECTION

CROSS REFERENCE TO RELATED APPLICATIONS

The present claims the benefit of U.S. Provisional Patent Application No. 63/596,648, filed Nov. 7, 2023, and entitled "Drive and Sense balanced 3-axis Gyroscope, with Enhanced Vibration Rejection and Shock Robustness," which is incorporated herein by reference in its entirety.

BACKGROUND

Numerous items such as smart phones, smart watches, tablets, automobiles, aerial drones, appliances, aircraft, exercise aids, and game controllers may utilize sensors such as microelectromechanical system (MEMS) sensors during their operation. In many applications, various types of motion sensors such as accelerometers and gyroscopes may be analyzed independently or together in order to determine varied information for particular applications. For example, gyroscopes and accelerometers may be used in gaming applications (e.g., smart phones or game controllers) to capture complex movements by a user, drones and other aircraft may determine orientation based on gyroscope measurements (e.g., roll, pitch, and yaw), and vehicles may utilize measurements for determining direction (e.g., for dead reckoning) and safety (e.g., to recognize skid or roll-over conditions).

A MEMS gyroscope may be implemented as a multi-axis device configured to sense angular velocities about two or three of an x-axis, y-axis, or z-axis. In some implementations, a suspended spring-mass system for the multi-axis MEMS gyroscope may include a shared drive system, such that proof masses associated with each of the axes have a drive motion imparted from the shared drive system via interconnections such as by springs, lever arms, and coupling masses. External forces such as linear accelerations, vibrations, and the like may reduce the accuracy and precision of the measurement of movements in response to Coriolis forces generated on proof masses in response to rotation about one of the sense axes. Further, because the proof masses for different sense axes are coupled within a common structure, drive and sense movements of the components associated with other sense axes may also impact the accuracy and precision of the measurement of the movements due to Coriolis force on another axis, such as by cross coupling of drive and/or sense forces. Attempts to minimize these sources of measurement errors often require duplication of components of sense and drive structures or complex compensation techniques, requiring additional area, materials, and consumption of energy.

SUMMARY

In at least some example approaches, a MEMS gyroscope comprises a first drive mass that is driven in a first direction along a first axis and a second drive mass that is driven parallel to the first axis in anti-phase to the first drive mass. The gyroscope also includes at least one in-plane proof mass coupled to the first drive mass and the second drive mass. The at least one in-plane proof mass is driven in a second direction different from the first direction. The gyroscope also includes a first out-of-plane proof mass coupled to the first drive mass to be driven in a first drive motion in the first direction and responsive to an angular velocity about an out-of-plane axis to cause a first in-plane Coriolis force perpendicular to the first drive motion. Additionally, the gyroscope includes a second out-of-plane proof mass coupled to the second drive mass to be driven in a second drive motion in anti-phase to the first drive motion and responsive to the angular velocity about an out-of-plane axis to cause a second in-plane Coriolis force in anti-phase to the first in-plane Coriolis force. The gyroscope also includes a coupling link between the first out-of-plane proof mass and the second out-of-plane proof mass. The coupling link causes the first out-of-plane proof mass and the second out-of-plane proof mass to reject a linear vibration and a rotational vibration.

In at least some example approaches, a method of assembling a MEMS gyroscope comprises providing a drive system having a first drive mass and a second drive mass. The first drive mass is driven in a first direction along a first axis, and the second drive mass is driven parallel to the first axis in anti-phase to the first drive mass. The method also includes installing at least one in-plane proof mass coupled to the first drive mass and the second drive mass. The at least one in-plane proof mass is driven in a second direction different from the first direction. The method further includes installing a first out-of-plane proof mass, with the first out-of-plane proof mass being coupled to the first drive mass to be driven in a first drive motion in the first direction and responsive to an angular velocity about an out-of-plane axis to cause a first in-plane Coriolis force perpendicular to the first drive motion. Additionally, the method includes installing a second out-of-plane proof mass, with the second out-of-plane proof mass being coupled to the second drive mass to be driven in a second drive motion in anti-phase to the first drive motion and responsive to the angular velocity about an out-of-plane axis to cause a second in-plane Coriolis force in anti-phase to the first in-plane Coriolis force. The method also includes coupling the first out-of-plane proof mass and the second out-of-plane proof mass with a coupling link configured to cause the first out-of-plane proof mass and the second out-of-plane proof mass to reject a linear vibration and a rotational vibration.

BRIEF DESCRIPTION OF DRAWINGS

The above and other features of the present disclosure, its nature, and various advantages will be more apparent upon consideration of the following detailed description, taken in conjunction with the accompanying drawings in which.

DETAILED DESCRIPTION

Figure 1:
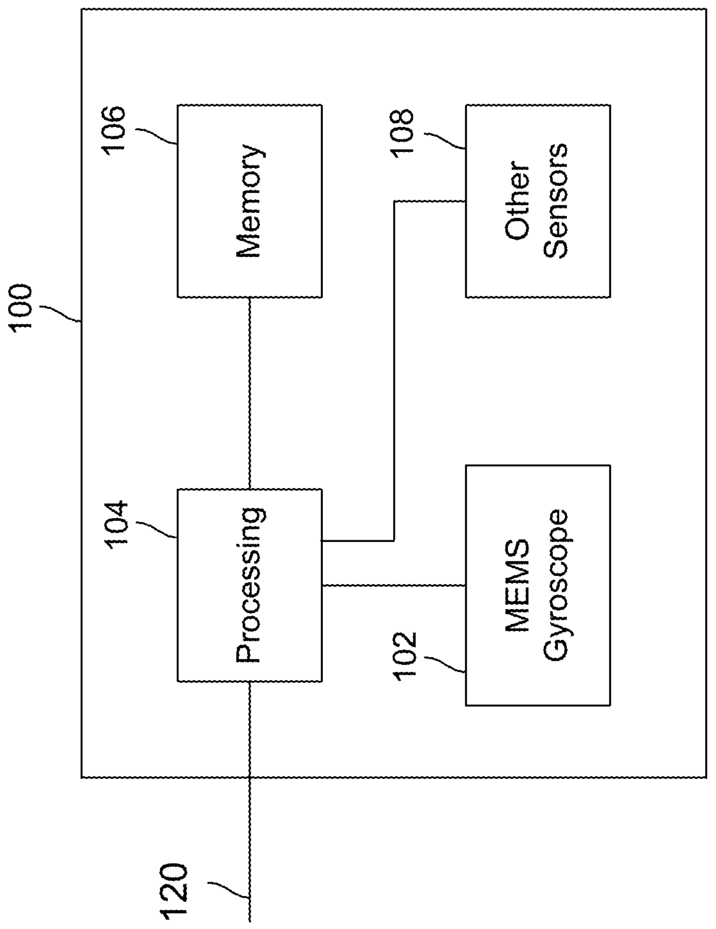
FIG. 1 shows an illustrative MEMS system in accordance with an embodiment of the present disclosure.

Generally, it is desired to reject external vibration and balance drive oscillations in MEMS devices such as gyroscopes. In some previous approaches involving multi-axis MEMS gyroscopes, multiple proof masses are driven by a shared drive system in a variety of directions, to enable sensing of a Coriolis force about multiple axes. The configurations of the proof masses and the interconnections between them may be such that forces that are not intended to be sensed, such as linear or rotational vibrations, may be counteracted within the structure, thus limiting erroneous sensing due to such vibrations. However, particularly for multi-axis systems, some of the proof masses may be isolated and configured in a manner such that they are susceptible to motion imposed by external vibrations, such as rotational vibrations. In the context of the present disclosure, an "in-plane proof mass" refers to a proof mass that experiences a Coriolis force in response to an angular velocity about an in-plane axis (e.g., the x-axis or the y-axis) while an "out-of-plane proof mass" refers to a proof mass that experiences a Coriolis force in response to an angular velocity about an out-of-plane axis (e.g., the z-axis). In different configurations, the sense motion of an in-plane proof mass may be in-plane or out-of-plane in response to the in-plane angular velocity, while the sense motion of an out-of-plane proof mass may be in-plane or out-of-plane in response to the out-of-plane angular velocity.

In embodiments of the present disclosure, a multi-axis MEMS gyroscope is capable of having a single drive motion move multiple interconnected proof masses to simultaneously sense angular velocity about multiple axes. The interconnections of the proof masses and configurations thereof provide for robustness to undesirable external accelerations and also result in a system that is balanced with respect to rotational momentum and to linear drive and sense forces. An out-of-plane (e.g., z-axis) proof mass may include multiple components including a driven mass and a sense mass, with the driven mass experiencing the Coriolis force during a drive motion while being coupled to the sense mass in a manner that the sense mass does not experience the drive motion, avoiding coupling of the drive motion to the in-plane sensing of the out-of-plane angular velocity. Further, a sense mass of an anti-phase second out-of-plane proof mass may be coupled to the other sense mass such that the anti-phase sense motion is robustly coupled, further enhancing sensitivity and rejection of spurious motions. Additionally, a coupling link between a pair of out-of-plane proof masses may be configured to reject translational vibrations and/or rotational vibrations, e.g., due to drive motions of other gyroscope components. For example, motion of the out-of-plane proof masses may be constrained or positioned relative to each other in a manner that reduces or prevents translational and/or rotational vibrations from being imparted to the out-of-plane proof masses. As a result, effects of the vibrations on a signal generated from the out-of-plane proof masses may be reduced or eliminated. Due to the configuration of the sense masses and the coupling link, motions that are not entirely rejected (e.g., causing common mode vibrations) may occur at frequency that is different (e.g., greater than) the differential mode sense frequency, such that it is relatively simple to distinguish such common mode vibrations.

FIG. 1 shows an illustrative MEMS system 100 in accordance with an embodiment of the present disclosure. Although particular components are depicted in FIG. 1, it will be understood that other suitable combinations of the MEMS, processing components, memory, and other circuitry may be utilized as necessary for different applications and systems. In accordance with the present disclosure, the MEMS system may include a MEMS gyroscope 102 as well as additional sensors 108. Although the present disclosure will be described in the context of particular MEMS gyroscope configurations (e.g., electrostatic drive and capacitive sensing of multiple axes, based on a shared drive system), it will be understood that of the present disclosure may be utilized with a variety of MEMS sensor types with mechanical coupling between axes.

Processing circuitry 104 may include one or more components providing processing based on the requirements of the MEMS system 100. In some embodiments, processing circuitry 104 may include hardware control logic that may be integrated within a chip of a sensor (e.g., on a base substrate of a MEMS gyroscope 102 or other sensors 108, or on an adjacent portion of a chip to the MEMS gyroscope 102 or other sensors 108) to control the operation of the MEMS gyroscope 102 or other sensors 108 and perform aspects of processing for the MEMS gyroscope 102 or the other sensors 108. In some embodiments, the MEMS gyroscope 102 and other sensors 108 may include one or more registers that allow aspects of the operation of hardware control logic to be modified (e.g., by modifying a value of a register). In some embodiments, processing circuitry 104 may also include a processor such as a microprocessor that executes software instructions, e.g., that are stored in memory 106. The microprocessor may control the operation of the MEMS gyroscope 102 by interacting with the hardware control logic and processing signals received from MEMS gyroscope 102. The microprocessor may interact with other sensors 108 in a similar manner. In some embodiments, some or all of the functions of the processing circuitry 104, and in some embodiments, of memory 106, may be implemented on an application specific integrated circuit ("ASIC") and/or a field programmable gate array ("FPGA").

Although in some embodiments (not depicted in FIG. 1), the MEMS gyroscope 102 or other sensors 108 may communicate directly with external circuitry (e.g., via a serial bus or direct connection to sensor outputs and control inputs), in an embodiment the processing circuitry 104 may process data received from the MEMS gyroscope 102 and other sensors 108 and communicate with external components via a communication interface 120 (e.g., a serial peripheral interface (SPI) or I2C bus, in automotive applications a controller area network (CAN) or Local Interconnect Network (LIN) bus, or in other applications a suitably wired or wireless communications interface as is known in the art). The processing circuitry 104 may convert signals received from the MEMS gyroscope 102 and other sensors 108 into appropriate measurement units (e.g., based on settings provided by other computing units communicating over the communication interface 120) and perform more complex processing to determine measurements such as orientation or Euler angles, and in some embodiments, to determine from sensor data whether a particular activity (e.g., walking, running, braking, skidding, rolling, etc.) is taking place. In some embodiments, some or all of the conversions or calculations may take place on the hardware control logic or other on-chip processing of the MEMS gyroscope 102 or other sensors 108.

In some embodiments, certain types of information may be determined based on data from multiple MEMS gyroscopes 102 and other sensors 108 in a process that may be referred to as sensor fusion. By combining information from a variety of sensors it may be possible to accurately determine information that is useful in a variety of applications, such as image stabilization, navigation systems, automotive controls and safety, dead reckoning, remote control and gaming devices, activity sensors, 3-dimensional cameras, industrial automation, and numerous other applications.

Figure 2A:
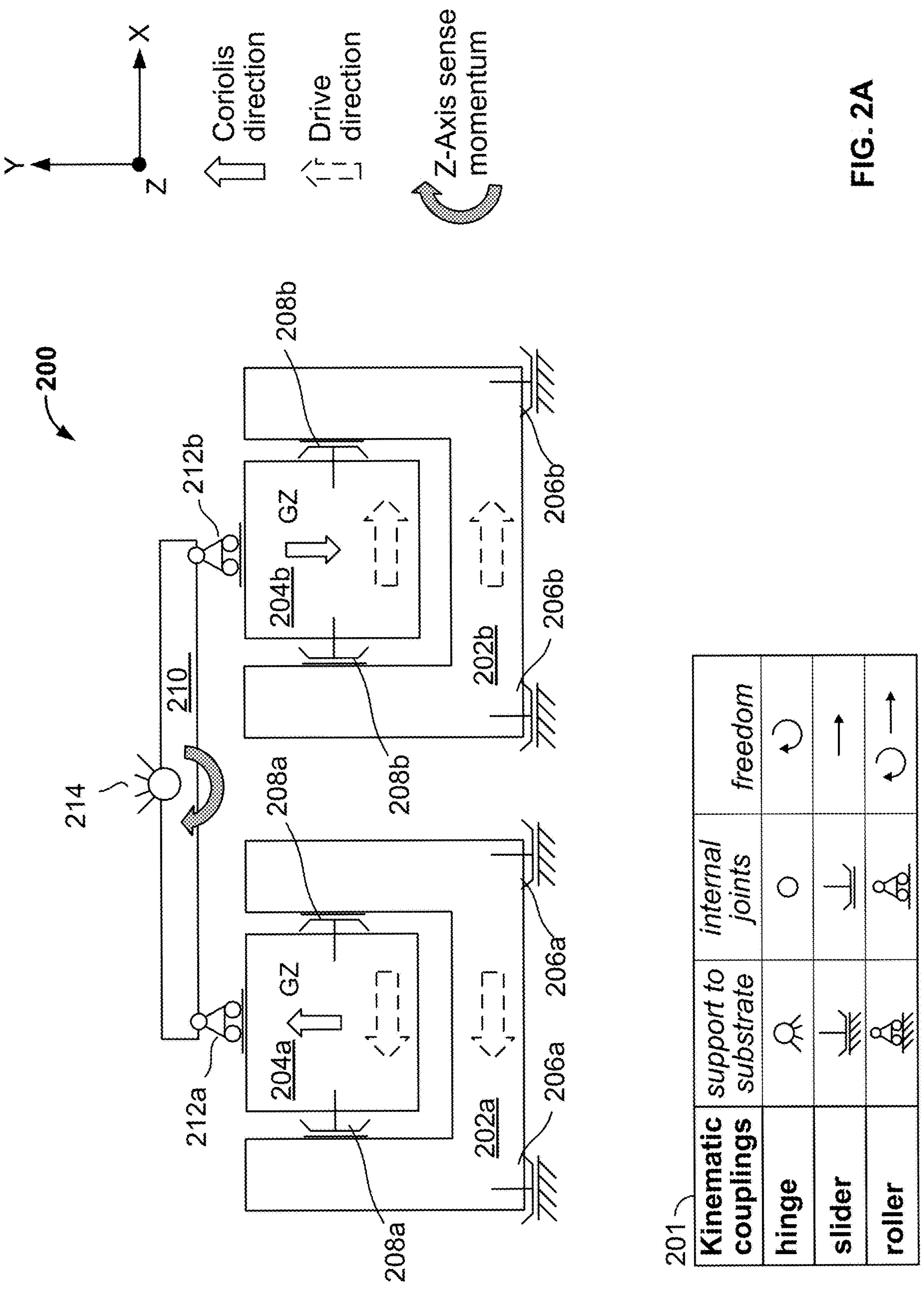
FIG. 2A depicts an exemplary z-axis drive and sense system with a rotational coupling.
Figure 2B:
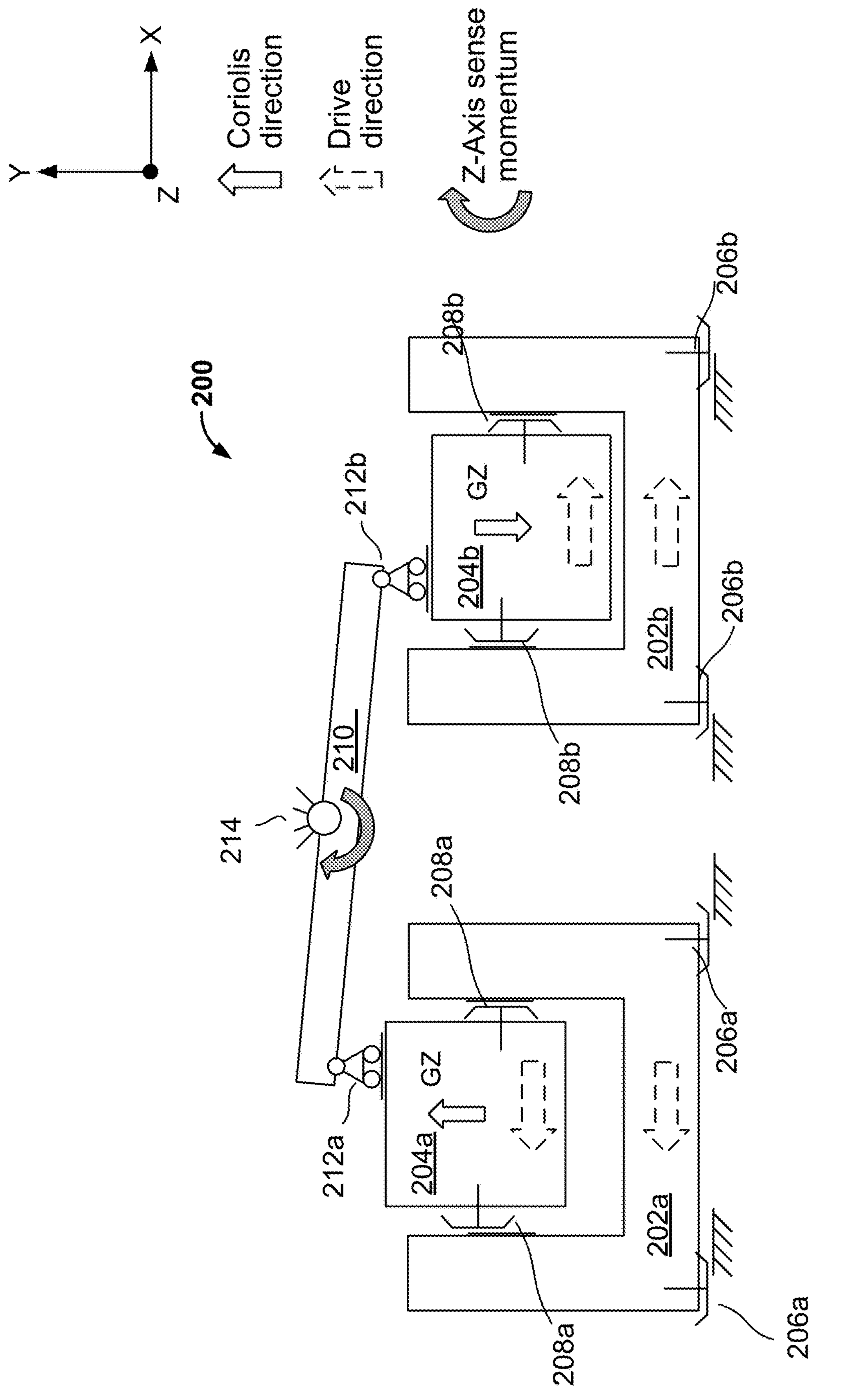
FIG. 2B depicts an exemplary drive and sense motion of the z-axis drive and sense system of FIG. 2A.

Turning now to FIG. 2A, a z-axis drive and sense system 200, e.g., for a MEMS gyroscope, is illustrated and described in further detail. FIG. 2B illustrates the drive and sense system 200 of FIG. 2A while a drive motion is imparted to components of the system 200, with the drive and other components of the gyroscope being moved as discussed further below. Although FIGS. 2A and 2B will be described in the context of a particular application and system components, it will be understood that the present disclosure may be utilized with a variety of multi-axis gyroscope configurations. Although particular components are depicted and described in FIGS. 2A and 2B, it will be understood that components may be added, removed, substituted, or modified in accordance with the present disclosure.

The depiction of the system of FIG. 2A and FIGS. 2B, as well as gyroscopes illustrated in FIGS. 3A-3D and 4A-4C herein are depicted in simplified form, in a manner that will be understood to person having ordinary skill in the art. Although particular shapes, sizes, and interconnections are depicted for components of masses, couplings, springs, and the like, it will be understood that a variety of configurations can be implemented in accordance with the present disclosure while maintaining respective relative linear and rotational movements in a manner that minimizes or eliminates internal coupling of undesired forces to the resulting sense motions. Certain components such as drive and sense electrodes are not depicted, but may be implemented in a variety of configurations as is known in the art.

In the figures depicted herein, the connections between gyroscope components and to anchoring points (e.g., on a fixed component within the MEMS device layer or via an anchor to a substrate and/or cap of the MEMS gyroscope) is depicted via kinematic couplings 201. It will be understood that each of the kinematic couplings 201 may be implemented with a variety of springs, couplings, coupling masses, lever arms, and other similar components that may be fabricated within a MEMS layer, for example, by selecting a size and shape of a spring to facilitate particular linear, rotational, or torsional coupling movements along or about particular axes while rejecting other movements. Accordingly, interconnections herein will be described based on the kinematic couplings of a "hinge" (e.g., facilitating rotational movement about an axis or hinge point), a "slider" (e.g., facilitating linear movement along an axis), and a "roller" (e.g., facilitating both linear and rotational movement), and will be understood to include all suitable implementations thereof.

The system 200 may include a drive system (not depicted in FIG. 2A) configured to impart a drive motion on a plurality of proof masses, e.g., within a device plane of the system 200. For example, a drive system may include one or more fixed drive electrodes (e.g., comb electrodes) located in the device plane adjacent to one or more driven masses (e.g., including interfacing comb electrodes) such as one of the proof masses or a separate drive mass. The drive motion is then imparted on other components of the system via interconnected springs, masses, couplings, lever arms, and the like to facilitate desired drive motions (e.g., linear translations and/or rotations along or about particular axes, perpendicular to an axis about which an angular velocity is to be sensed and also perpendicular to a direction of a Coriolis force generated by the coupling of the angular velocity to the drive motion) on one or more masses (e.g., directly on a proof mass or on an adjacent mass that couples the movement due to Coriolis to a proof mass).

In the example system 200 illustrated in FIG. 2A, a drive motion is imparted to a first drive mass 202*a* (e.g., such as via comb electrodes via adjacent fixed comb electrodes) along the x-axis, and is configured to be driven in anti-phase along the x-axis (dashed arrows, only one drive direction depicted) establishing a first axis in the device plane. Second drive mass 202*b* is similarly driven along the first axis in anti-phase to first drive mass 202*a*, such that first drive mass 202*a* and second drive mass 202*b* are either moving in anti-phase away from each other (e.g., as depicted in FIG. 2A) or towards each other (e.g., during each drive mass's opposite antiphase motion). Sliders 206*b* are located between first drive mass 202*a* and first out-of-plane proof mass 204*a* (e.g., responsive to a Coriolis force generated by a rotation about the z-axis) to transmit the x-axis anti-phase drive motion from first drive mass 202*a* to the first out-of-plane proof mass 204*a*, while permitting out-of-plane proof mass 204*a* to move along the y-axis in response to a Coriolis force. Similarly, sliders 206*b* are located between second drive mass 202*b* and second out-of-plane proof mass 204*b* (e.g., responsive to a Coriolis force generated by a rotation about the z-axis) to transmit the x-axis anti-phase drive motion from second drive mass 202*b* to the second out-of-plane proof mass 204*b*, while permitting out-of-plane proof mass 204*b* to move along the y-axis in anti-phase to first out-of-plane proof mass 204*a* in response to a Coriolis force. Although not depicted in FIGS. 2A-2D, in some implementations that drive masses 202*a* and 202*b* may themselves be proof masses, for example, for sensing a rotation about an in-plane axis (e.g., about an x-axis or y-axis), with appropriate couplings and connections to move out-of-plane in anti-phase to each other in response to a Coriolis force generated by such a rotation.

In the examples herein, one or more coupling links, lever arms, or other rigid bodies may be configured to link movement of the out-of-plane proof mass 204*a* to that of the out-of-plane proof mass 204*b*. For example, as shown in FIG. 2A the first out-of-plane proof mass 204*a* is linked to the second out-of-plane proof mass 204*b* via a coupling link 210. Coupling link 210 is provided as a rigid body or arm connected to the proof masses via one or more rollers 212*a*, 212*b* and fixed via a hinge 214. More specifically, the coupling link 210 is rotatable about the z-axis by way of the hinge 214. The coupling link 210 engages the first out-of-plane proof mass 204*a* with a first roller 212*a*, and the second out-of-plane proof mass 204*b* with a second roller 212*b*, and synchronizes the anti-phase translation of the first out-of-plane proof mass 204*a* and the second out-of-plane proof mass 204*b* relative to each other. More specifically, the coupling link 210 rotates about hinge 214 in response to translation of the out-of-plane proof masses 204*a* and 204*b* in opposite directions in the device plane, e.g., as may result from an angular velocity about an out-of-plane axis (e.g., the z-axis).

Figure 2C:
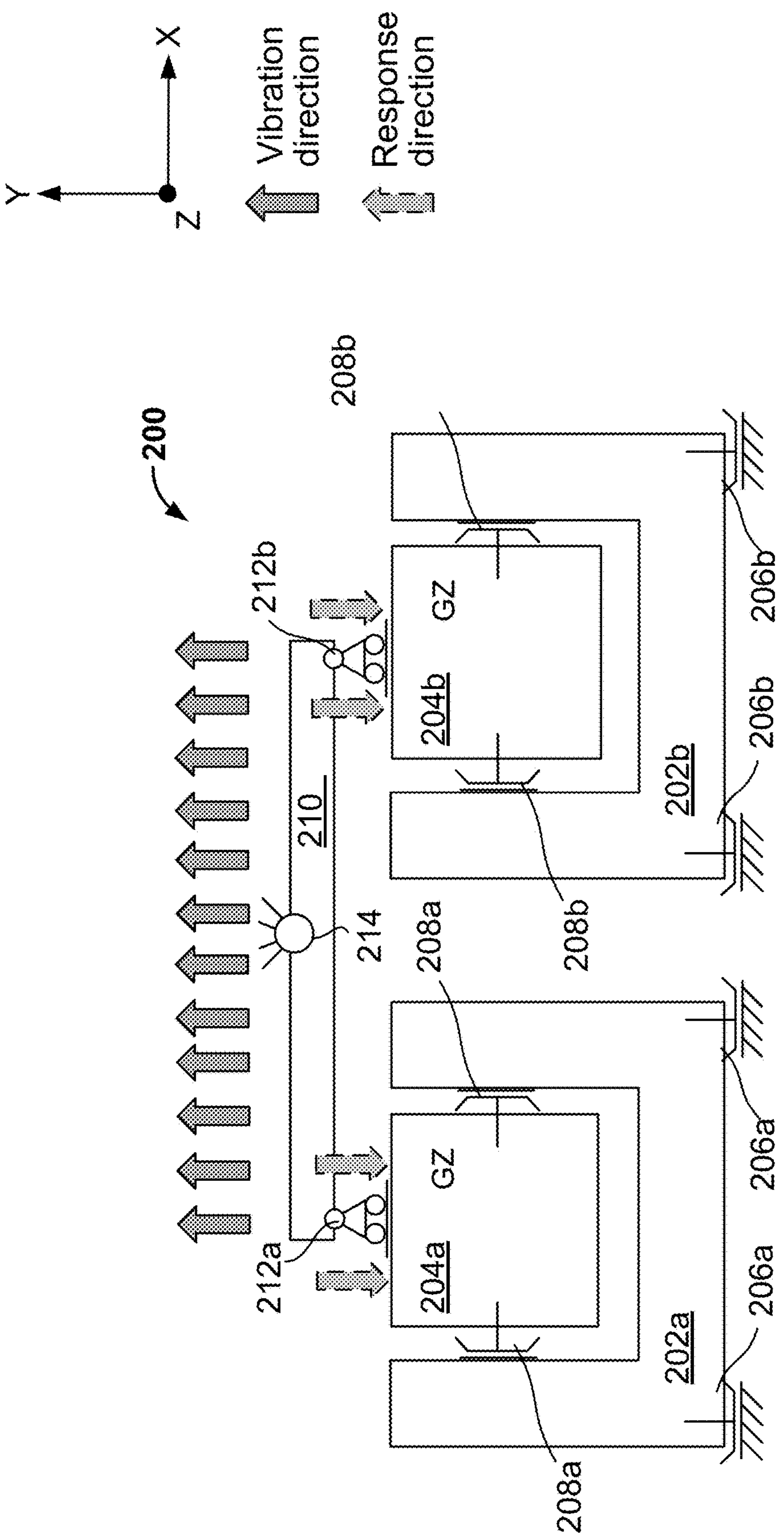
FIG. 2C depicts an exemplary response of the z-axis drive and sense system of FIG. 2A to a linear vibration.

Referring now to FIG. 2C, the system 200 is illustrated being subjected to a translational vibration. For example, an external force or vibration may be imparted such as along a negative y-direction, thereby imparting vibration to the system 200 in the direction indicated in FIG. 2C by the shaded arrows. The rotational coupling of the system 200, however, is resistant to the vibration as a result of the proof masses, i.e., drive masses 202 and out-of-plane proof masses 204, being distributed equally on either side of the hinge 214 of the rotational coupling. Accordingly, capacitive signals generated based upon position and/or movement of the out-of-plane proof masses 204 are independent of the translational vibration. In this manner, the coupling of the out-of-plane proof masses 204 rejects the translational vibration illustrated.

Figure 2D:
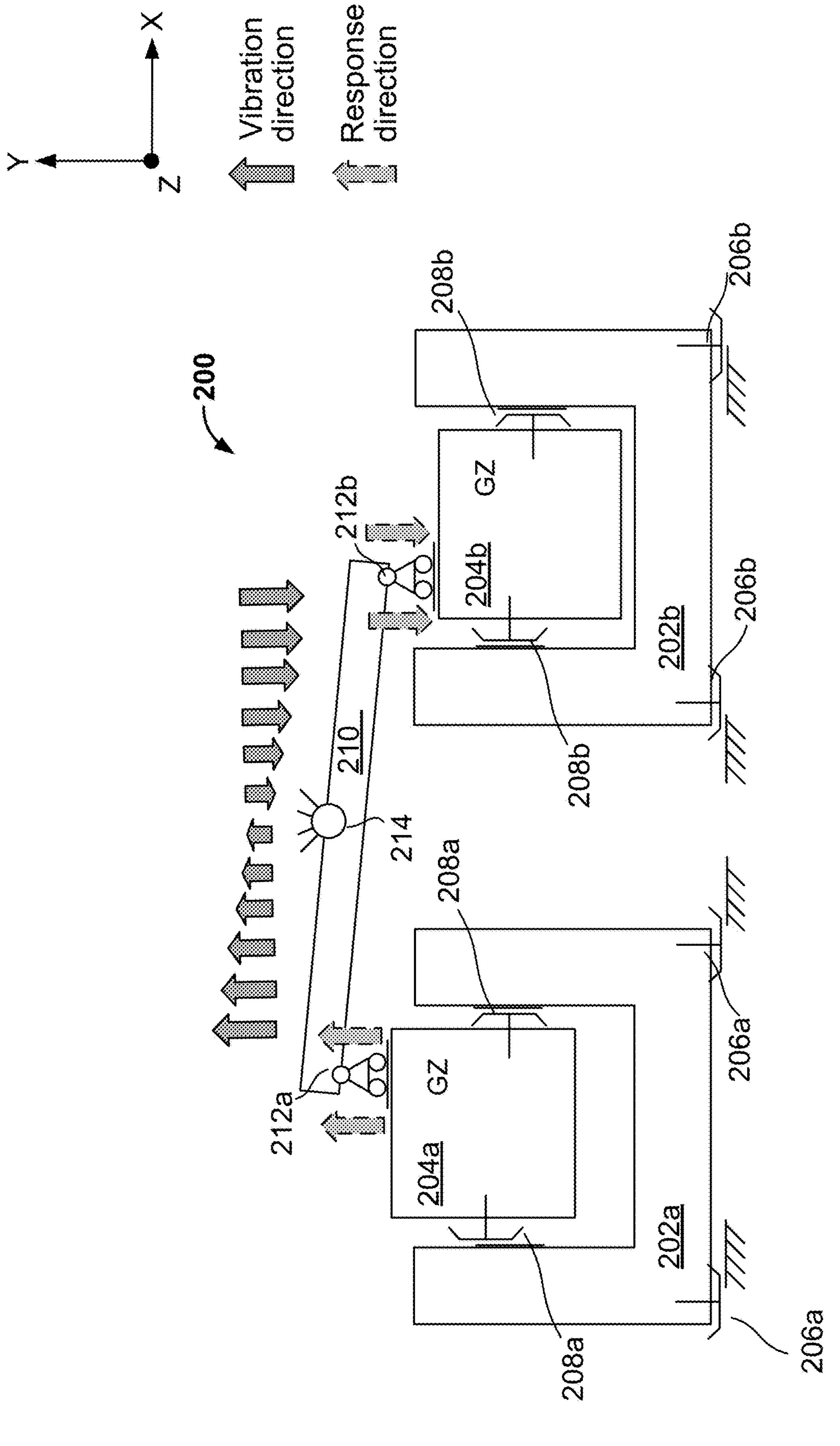
FIG. 2D depicts an exemplary response of the z-axis drive and sense system of FIG. 2A to a rotational vibration.

Referring now to FIG. 2D, the system 200 is illustrated being subjected to a rotational vibration. For example, an external rotational force may be experienced and/or coupled to system 200 components, for example, as indicated in FIG. 2D by the shaded arrows. The proof masses, i.e., drive masses 202 and out-of-plane proof masses 204, may be influenced by the rotational vibration as depicted by the "responsive direction" arrows, and as a result this may cause disturbances in capacitive signals generated based upon position and/or movement of the out-of-plane proof masses 204. Accordingly, in examples that follow below in FIGS. 3A-3D and FIGS. 4A-4C, example systems are provided to reduce or eliminate influence of a rotational vibration on output of out-of-plane proof masses.

Figure 3A:
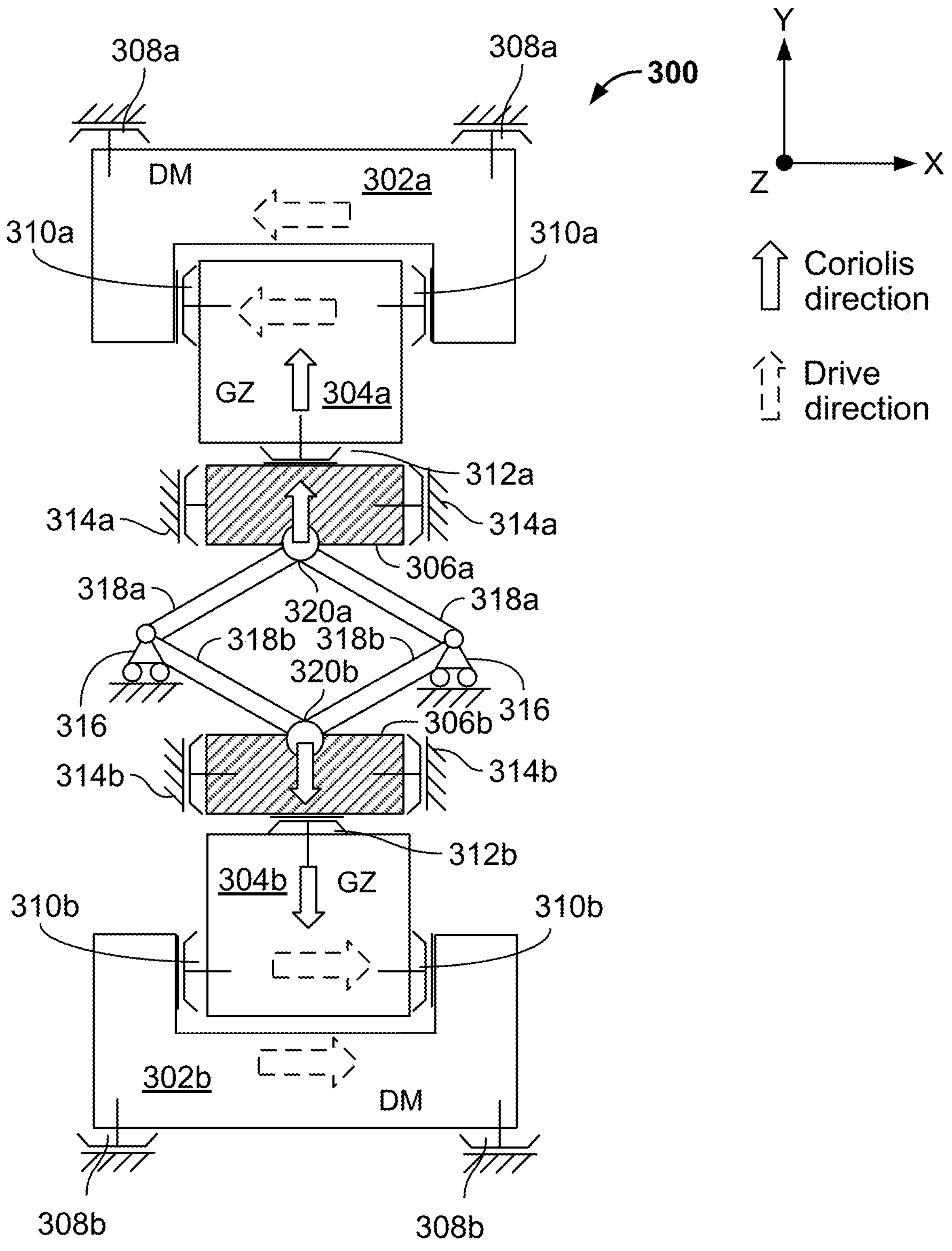
FIG. 3A depicts an exemplary balanced z-axis drive and sense system in accordance with an embodiment of the present disclosure.
Figure 3B:
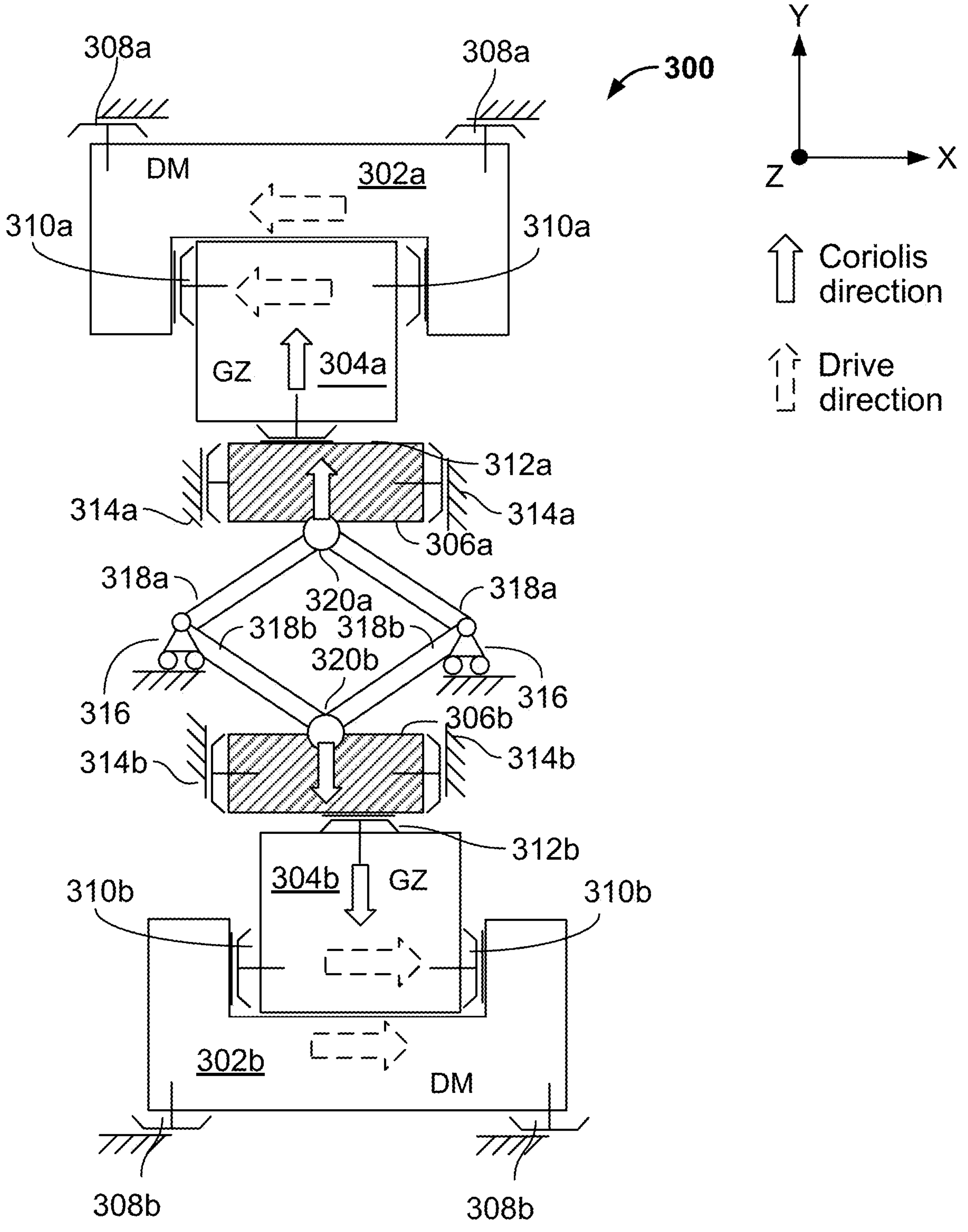
FIG. 3B depicts an exemplary drive and sense motion of a balanced z-axis drive and sense system of FIG. 3A in accordance with an embodiment of the present disclosure.

Turning now to FIG. 3A, an exemplary drive balanced z-axis MEMS gyroscope 300 is illustrated and described in further detail, in accordance with an embodiment of the present disclosure. FIG. 3B illustrates the gyroscope 300 of FIG. 3A while a drive motion is imparted to components of the gyroscope 300, with the drive and other components of the gyroscope being moved as discussed further below. Although FIGS. 3A and 3B will be described in the context of a particular application and system components, it will be understood that the present disclosure may be utilized with a variety of multi-axis gyroscope configurations. Although particular components are depicted and described in FIGS. 3A and 3B, it will be understood that components may be added, removed, substituted, or modified in accordance with the present disclosure.

The MEMS gyroscope 300 may include a drive system (not depicted in FIG. 3A) configured to impart a drive motion on the drive masses 302*a* and 302*b*, e.g., within a device plane of the MEMS gyroscope 300. For example, a drive system may include one or more fixed drive electrodes (e.g., comb electrodes) located in the device plane adjacent to one or more drive masses (e.g., including interfacing comb electrodes). The drive motion is then imparted on other components of the system via interconnected springs, masses, couplings, lever arms, and the like to facilitate desired drive motions (e.g., linear translations and/or rotations along or about particular axes, perpendicular to an axis about which an angular velocity is to be sensed and also perpendicular to a direction of a Coriolis force generated by the coupling of the angular velocity to the drive motion) on one or more masses (e.g., directly on a proof mass or on an adjacent mass that couples the movement due to Coriolis to a proof mass).

In the example illustrated in FIG. 3A, a drive motion is imparted to a first drive mass 302*a* (e.g., directly or via one or more fixed drive electrodes (not depicted)) along the x-axis, with a second drive mass 302*b* being driven in anti-phase along the x-axis (dashed arrows, only one drive direction), establishing two parallel drive axes in the device plane. The drive motion causes the first drive mass 302*a* to oscillate such that the drive mass 302*b* moves in the direction indicated by the dashed arrow and subsequently in the opposite direction. The second drive mass 302*b* is operably coupled to the drive system to oscillate in anti-phase to the first drive mass 302*a* in response to the drive motion. The oscillation of the first drive mass 302*a* and second drive mass 302*b* in opposite directions may balance out reaction forces associated with the movement of the first and second drive masses 302*a* and 302*b*.

The gyroscope 300 also includes one or more out-of-plane proof masses. The out-of-plane proof masses may be configured to move in response to an angular velocity applied to the gyroscope about an axis perpendicular to the device plane (e.g., about the z-axis). In the illustrated example of FIG. 3A, the gyroscope 300 includes two out-of-plane proof masses, each including a respective driven mass and sense mass. A first out-of-plane proof mass includes a first driven mass 304*a* and first sense mass 306*a*, while a second out-of-plane proof mass is provided by a second driven mass 304*b* and a second sense mass 306*b*. The sense masses 306*a* and 306*b* are each constrained to movement along the Coriolis direction, e.g., by respective sliders 314*a* and 314*b*. For example, first sense mass 306*a* is slidably retained between a pair of first sliders 314*a*, and the second sense mass 306*b* is slidably retained between a pair of second sliders 314*b*.

The first driven mass 304*a* is operably coupled to the drive system via the first drive mass 302*a*. More specifically, the first driven mass 304*a* is connected by sliders 310*a* to the first in-plane drive mass 302*a*, which directly transmit the drive motion of the in-plane drive mass 302*s* such that the first driven mass 304*a* oscillates with the oscillation of the in-plane drive mass 302*s*. Accordingly, the first driven mass 304*a* oscillates in the device plane, e.g., along an axis parallel to the first/x-axis (i.e., the axis of movement of the in-plane drive mass 302*a*) in response to the drive motion of the in-plane drive mass 302*b*. Further, the first driven mass 304*a* moves in the device plane along the y-axis perpendicular to the first (drive or x-) axis in response to a Coriolis force caused by an angular velocity about an out-of-plane axis (e.g., the z-axis). For example, as illustrated in FIGS. 3A-B, a Coriolis force will cause the driven mass 304*a* to move upwardly in response to an angular velocity about the out-of-plane axis in a particular rotational direction, e.g., an axis perpendicular to the device plane such as the z-axis.

The first sense mass 306*a* is coupled to the first driven mass 304*a* by slider 312*a* such that the first sense mass 306*a* does not move along the x-axis in the device plane in response to the drive motion. The first sense mass 306*a* may translate perpendicular to the first axis (e.g., upward along the y-axis as illustrated in FIG. 3B) based on the movement of the first driven mass 304*a* due to a Coriolis force in response to the angular velocity about the out-of-plane axis. In this manner, slider 312*a* functions as a Coriolis coupling that does not transmit a drive force between the drive and sense mass but does transmit the Coriolis force. More specifically, the slider 312*a* is compliant in response to the drive motion in the x-direction (e.g., drive movement of the driven mass 304*a* is not translated to the first sense mass 306*a*) and is rigid in response to a Coriolis force in the y-direction caused by the angular velocity about the out-of-plane axis (e.g., the first sense mass 306*a* moves in the Coriolis (y-axis) direction with the first driven mass 304*a* in response to an angular velocity about the out-of-plane z-axis). Similarly, a slider 312*b* is provided between the second driven mass 304*b* and the second sense mass 306*b*. The slider 312*b* is compliant in response to the drive motion in the x-direction and is rigid in response to the Coriolis force caused by the angular velocity about the out-of-plane z-axis. Accordingly, in examples herein the first and the second sense masses 306*a* and 306*b* may achieve differential mode coupling of the Coriolis response, e.g., as a result of the Coriolis couplings 312*a* and 312*b*.

Generally, the second out-of-plane proof mass (i.e., second driven mass 304*b* and second sense mass 306*b*) is configured similarly to the first out-of-plane proof mass (i.e., first driven mass 304*a* and first sense mass 306*a*) described above. That is, the second drive mass 304*b* is operably coupled to the drive system via the sliders 310*b* and the second drive mass 302*b*. Accordingly, the second driven mass 304*b* will oscillate in response to drive motion of second drive mass 302*b*. Moreover, the oscillatory motion of the second driven mass 304*b* will be opposite that of the first driven mass 304*a* within the device plane. In this manner, the second driven mass 304*b* will be in anti-phase to the first driven mass 304*a* in the device plane in response to the drive motion. Furthermore, the second driven mass 304*b* will also move in the device plane perpendicular to the first axis in anti-phase to the first driven mass 304*a* in response to the above-described angular velocity about the out-of-plane axis. As illustrated in FIG. 3B, Coriolis forces imparted to the driven masses 304*a* and 304*b* as a result of the angular velocity will tend to drive the driven masses 304*a* and 304*b* apart from each other or towards each other, depending on the drive direction and whether the angular velocity is imparted clockwise or counter-clockwise about the out-of-plane z-axis.

The second proof mass also includes the second sense mass 306*b* which is coupled to the second driven mass 304*b* by slider 312*b*. The second sense mass 306*b* does not move in the device plane in response to the drive motion as a result of slider 312*b* allowing relative translation in the device plane (e.g., along the x-direction as illustrated in FIGS. 3A and 3B). The second sense mass 306*b* does, however, translate perpendicular to the first axis along the y-axis in anti-phase to the first sense mass 306*a* based on the movement of the first driven mass 304*a* and in response to the angular velocity about the out-of-plane axis (e.g., the z-axis). Accordingly, the first and second sense masses 306*a*, 306*b* may sense angular velocity (e.g., by moving relative to fixed sense electrodes within the device plane, not depicted) while being decoupled from drive movement of the driven masses 304*a*, 304*b*, respectively. Further, the separation of the out-of-plane proof mass into distinct driven mass 304 and sense mass 306 improves the effective area of the sensing electrodes located adjacent to the sense mass, which only moves in response to the Coriolis force.

The second out-of-plane proof mass (i.e., including the second driven mass 304*b* and second sense mass 306*b*) is linked to the first out-of-plane proof mass (i.e., first driven mass 304*a* and first sense mass 306*a*) via a coupling link 318. In the example illustrated in FIGS. 3A and 3B, multiple coupling links 318 are provided as rigid bodies or arms that are connected via one or more rollers 316*a* and 316*b* and hinges 320*a* and 320*b*. More specifically, in the example illustrated each of two upper coupling links 318*a* are connected to a respective one of two lower coupling links 318*b* via one of the rollers 316*a* and 316*b*. The first sense mass 306*a* is connected to the upper coupling links 318*a* via hinge 320*a*, and the second sense mass 306*b* is connected to the lower coupling links 318*b* via hinge 320*b*. The coupling link 318 synchronizes the anti-phase translation of the first sense mass 306*a* and the second sense mass 306*b*. More specifically, when the anti-phase translation of the out-of-plane sense masses 306*a* and 306*b* is towards each other, hinges 320*a* and 320*b*, and rollers 316, allow the coupling links 318*a* and 318*b* to move towards each other along the y-direction and outward along the x-direction based on the x-axis linear degree of freedom of rollers 316. When the anti-phase translation of the out-of-plane sense masses 306*a* and 306*b* is away from each other, hinges 320*a* and 320*b*, and roller 316, allow the coupling links 318*a* and 318*b* to move away from each other in the y-direction and inward along the x-direction based on the x-axis linear degree of freedom of rollers 316. Although not present in the example illustrated in FIG. 3A, in some cases movement of the first drive mass 302*a* may be linked to that of the second drive mass 302*b*, e.g., to link drive movement in the device plane of the first drive mass 302*a* to that of the second drive mass 302*b* (and vice versa).

The arrows depicted in FIG. 3A depict drive directions (dashed arrows) and Coriolis sense direction (solid arrows). Although not depicted in FIGS. 3A and 3B, the driven masses 304*a* and 304*b* of the out-of-plane proof masses may also be used to sense rotation about the in-plane axis (e.g., based on sense electrodes parallel to the device plane such as on a substrate below the driven masses 304*a* and 304*b*), for example, by moving out of plane similar to the in-plane drive masses 302*a* and 302*b*. FIG. 3A shows these components prior to any drive motion being imparted (e.g., at a center point of the x-axis drive oscillation), while the movement of the gyroscope components in response to this drive motion is depicted in FIG. 3B. It will be understood that during the anti-phase portion of the drive oscillation each of the arrows will point in an opposite direction, e.g., with the x-axis drive motion of in-plane drive mass 302*b* and driven mass 304*a* of the upper out-of-plane proof mass in the positive x-direction, the x-axis drive motion of in-plane drive mass 302*b* and driven mass 304*b* of the lower out-of-plane proof mass in the negative x-direction, the Coriolis motion of the driven mass 304*a* and sense mass 306*a* of the upper out-of-plane proof mass in the negative y-direction, and the Coriolis motion of the driven mass 304*b* and sense mass 306*b* of the lower out-of-plane proof mass in the positive y-direction.

In the example illustrations of FIGS. 3A and 3B, the sense masses 306*a* and 306*b* are connected within a sense architecture that is independent of a drive mechanism for the gyroscope 300. Accordingly, drive motion is not imparted to either of the sense masses 306*a* or 306*b*. Moreover, the sense masses 306*a* and 306*b* are coupled in a manner that restricts movement to the anti-phase (e.g., along a y-axis) sense direction. Furthermore, as will be described further below, the structure of the gyroscope causes the sense masses 306*a* and 306*b* to reject a linear vibration and a rotational vibration, as will be discussed further below.

In at least some examples, a linear vibration and/or rotational vibration may occur as a "common mode" disturbance or force applied to the sense masses 306*a* and 306*b*. A common mode disturbance or force generally may cause the sense masses 306*a* and 306*b* to move in a same direction or manner, such that both sense masses 306 are affected generally equally. In the instance of translational vibrations imparted on the sense masses 306*a* and 306*b* along the y-direction (e.g., a common mode vibration), the components are selected such that this common mode vibration will be at a frequency that is different (e.g., higher) and readily distinguishable from the differential mode sense vibrations.

Figure 3C:
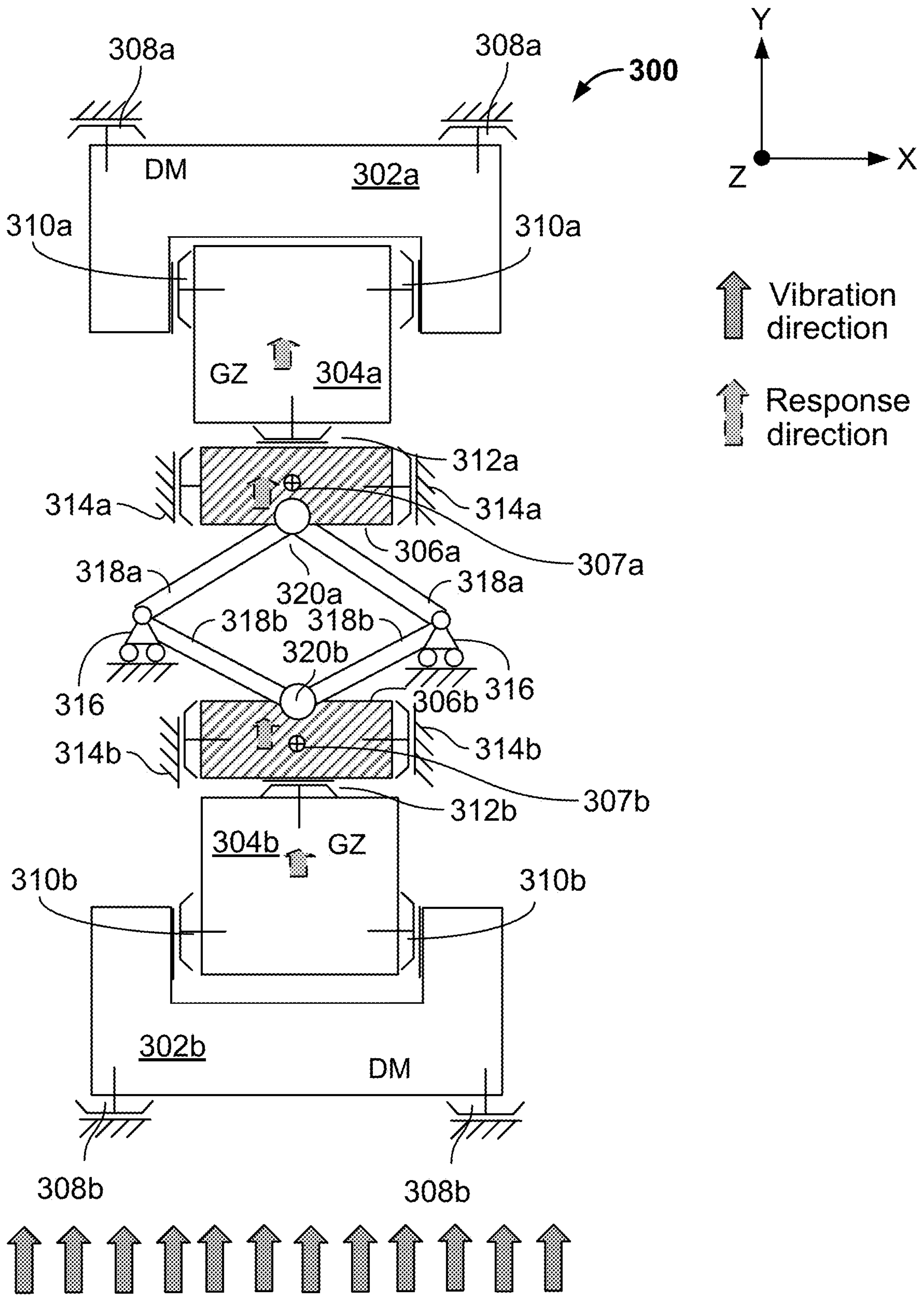
FIG. 3C depicts an exemplary response of the exemplary balanced z-axis drive and sense system of FIG. 3A to a linear vibration in accordance with an embodiment of the present disclosure.

Referring now to FIG. 3C, a linear or translational vibration (shaded arrows) is illustrated being applied to the gyroscope 300. For example, such a vibration may occur as a common mode disturbance where a vibration is imparted to the gyroscope 300. The coupling link 318 between the sense mass 306*a* (i.e., of the first out-of-plane proof mass) and sense mass 306*b* (i.e., of the second out-of-plane proof mass) causes the sense mass 306*a* and the sense mass 306*b* to partially reject the linear vibration and generally dampens the vibration, resulting in a common mode frequency that is different between the differential (sense) mode frequency. More specifically, as noted above the coupling link 318 limits or absorbs movement of the sense masses 306*a* and 306*b* to anti-phase translation in the sense direction (i.e., along the y-axis). The linear vibration applies force to each of the sense masses 306*a* and 306*b* in a same direction (as indicated by the shaded/solid arrows) . . . . The linear vibration applies a force to each of the sense masses 306*a* and 306*b*, but the coupling link 318 and restraint of the sense masses 306 by their respective sliders 314*a* and 314*b* prevents significant movement of the sense masses 306*a* or 306*b* that would otherwise result from the force (e.g., as indicated by the shortened "Response Direction" arrows). The coupling link 318 can be relatively stiff, such that compliance to movement of the sense masses 306 may be relatively low. The stiffness of the coupling link 318 and natural frequency of the sense masses 306 and coupling link 318 may be such that the sense masses 306 are resistant to common mode disturbances. Accordingly, a response to a common mode disturbance of the sense masses 306 and coupling link 318 may be stiffer than an anti-phase movement of the sense masses 306.

Figure 3D:
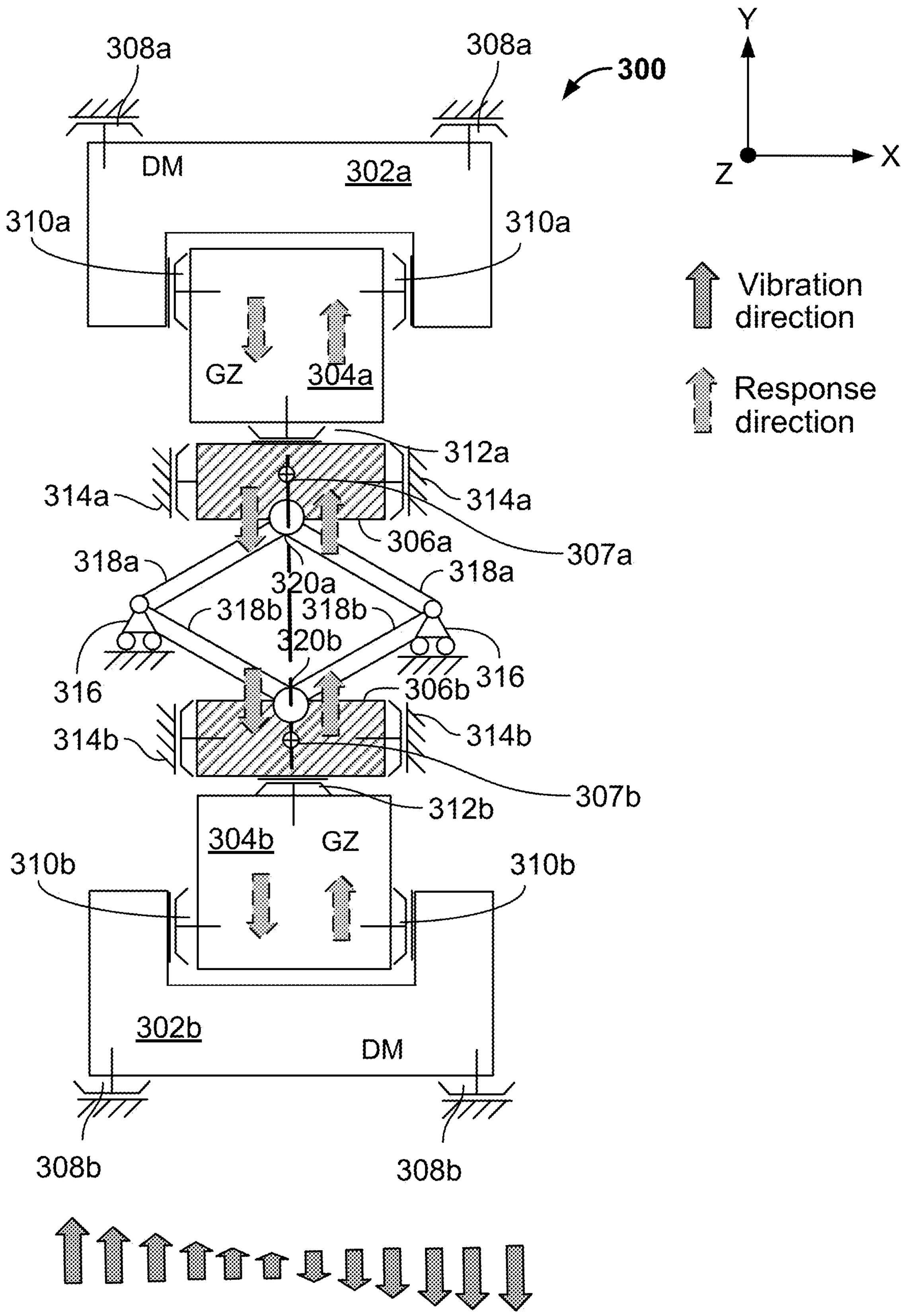
FIG. 3D depicts an exemplary response of the exemplary balanced z-axis drive and sense system of FIG. 3A to a rotational vibration in accordance with an embodiment of the present disclosure.

Referring now to FIG. 3D, an undesired rotational vibration (shaded arrows) is illustrated being applied to the gyroscope 300. The coupling link 318 between the sense mass 306*a* (i.e., of the first out-of-plane proof mass) and sense mass 306*b* (i.e., of the second out-of-plane proof mass) causes the sense mass 306*a* and the sense mass 306*b* to reject the rotational vibration. The center of masses of sense masses 306*a* and 306*b* and driven masses 304*a* and 304*b* are aligned along the y-axis. As a result of this alignment, the rotational vibration produces the same force, in the y-direction, on sense mass 306*a* as on sense 306*b*, and the same force on driven mass 304*a* as on driven mass 304*b*. Therefore, the net effect of the rotational vibration is effectively equivalent to a translational vibration (same force everywhere) and is rejected. Accordingly, the coupling link 318 causes the sense masses 306*a* and 306*b* to reject the rotational vibration, thereby reducing or eliminating influence of the rotational vibration on a capacitive signal determined from a position of the sense masses 306*a* and 306*b*. Additionally, as noted above the centers of mass 307*a* and 307*b* may be aligned along the sense direction (i.e., the y-direction). This alignment of the center of masses 307*a* and 307*b* may reduce or eliminate differential forces or torques that might otherwise be imparted to the coupling link 318 or other components due to rotational vibrations.

Figure 4A:
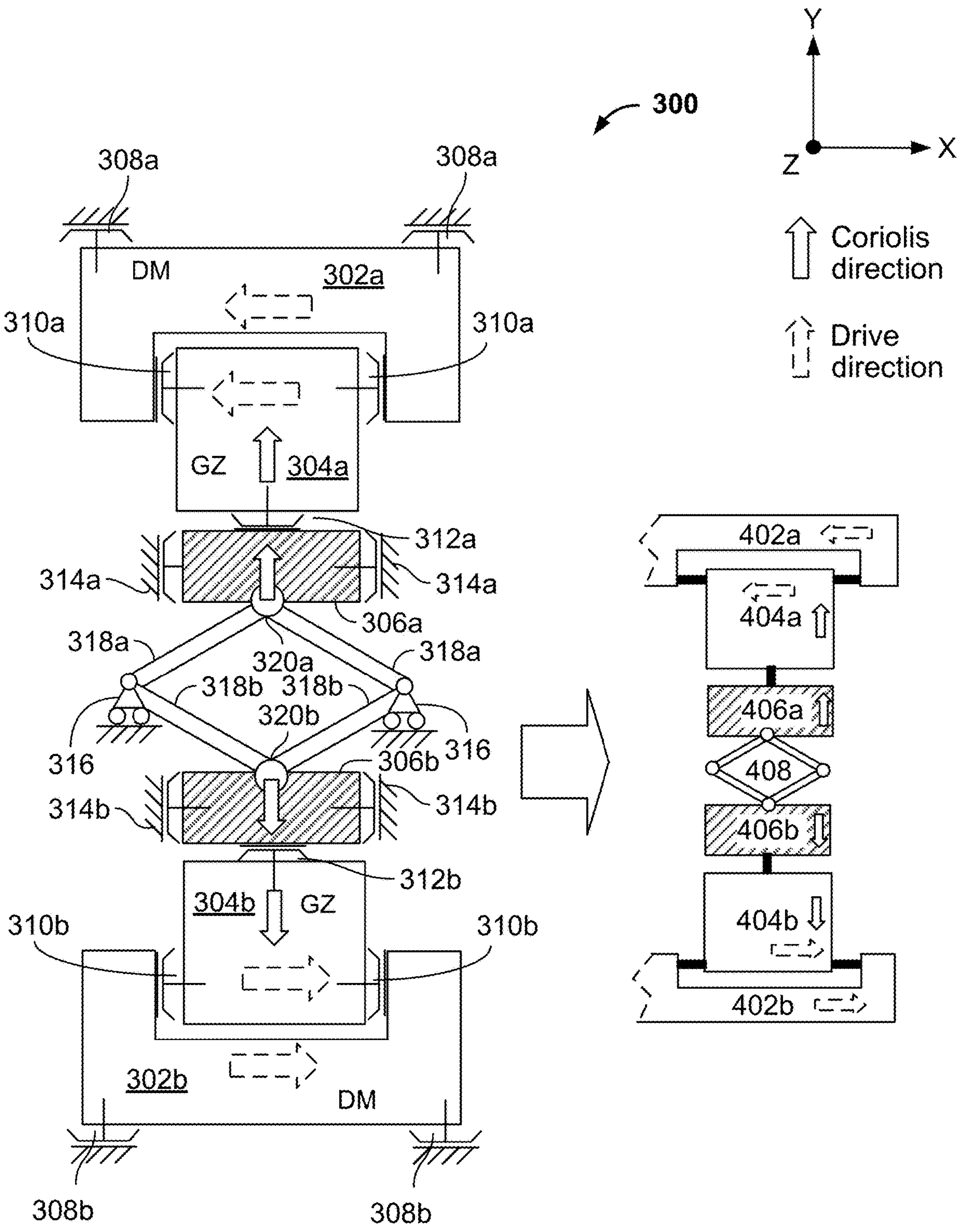
FIG. 4A depicts the exemplary balanced z-axis drive and sense system and corresponding simplified components of FIGS. 3A-3D, in accordance with an embodiment of the present disclosure.
Figure 4B:
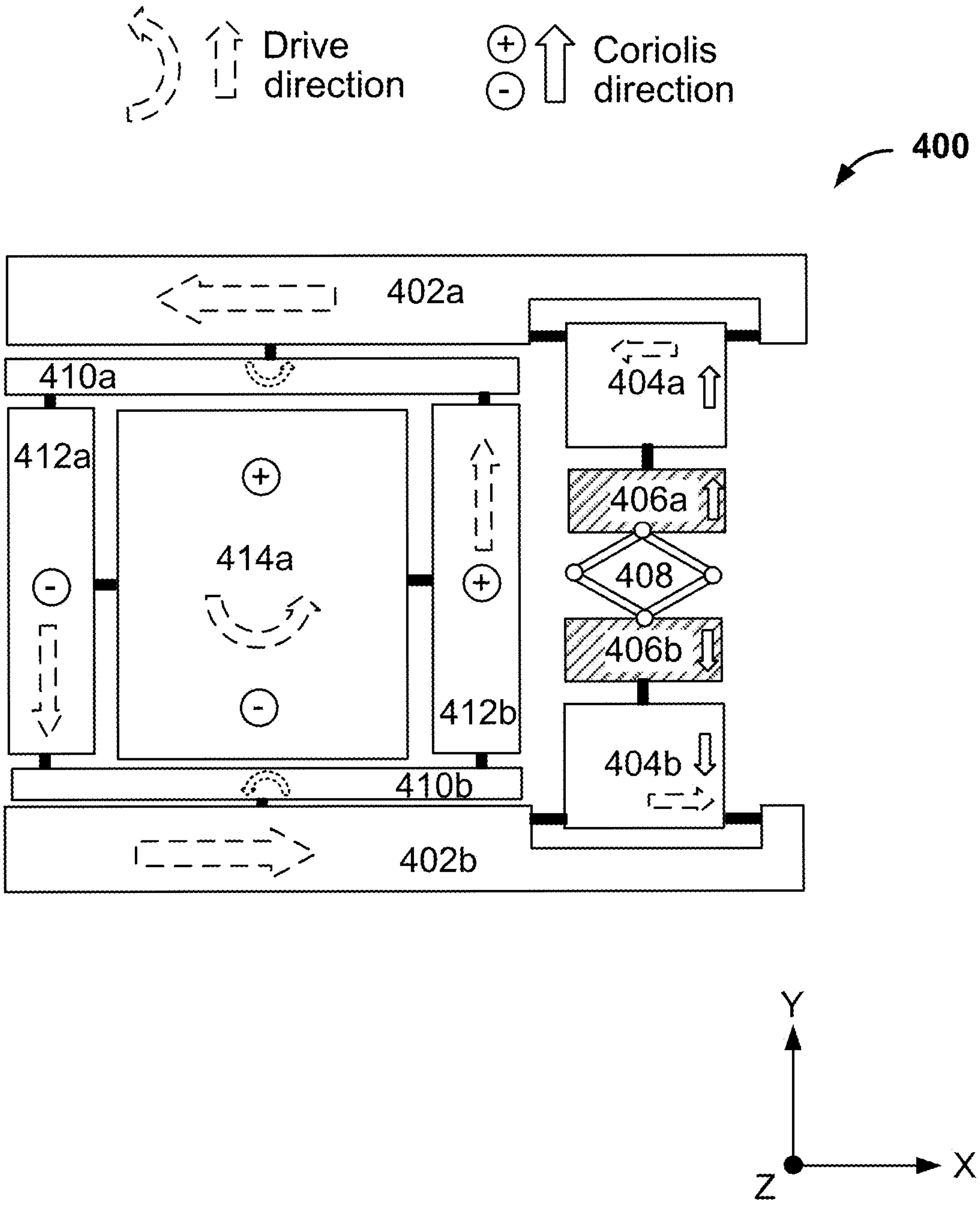
FIG. 4B depicts an exemplary 3-axis gyroscope including a balanced z-axis drive and sense system with the simplified components of FIG. 4A, in accordance with an embodiment of the present disclosure.
Figure 4C:
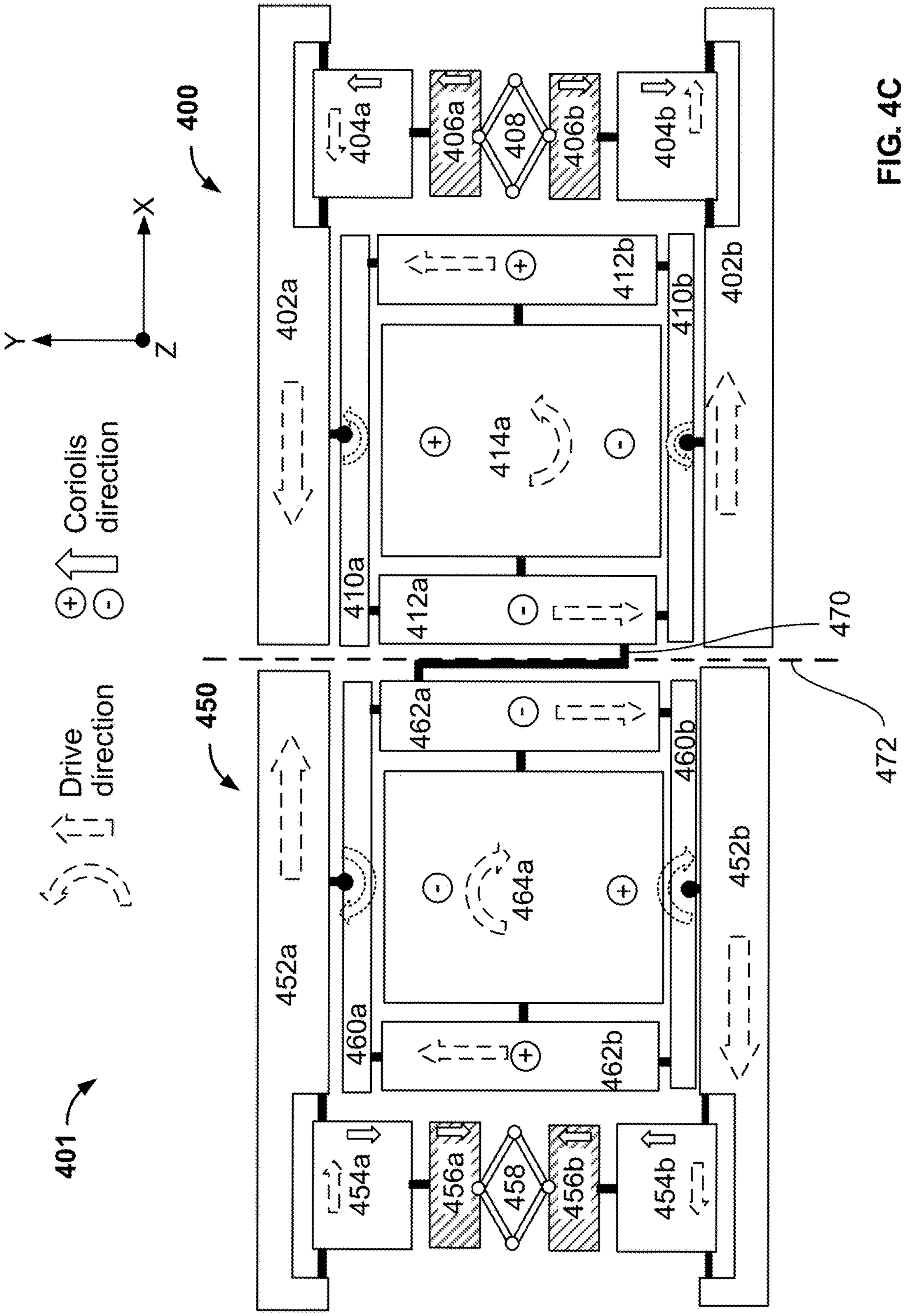
FIG. 4C depicts an exemplary 3-axis gyroscope including a balanced z-axis drive and sense system in a mirrored configuration in accordance with an embodiment of the present disclosure.

Referring now to FIGS. 4A-4C, the example gyroscope 300 illustrated in FIGS. 3A-3D is shown incorporated into a balanced multi-axis gyroscope system 400. As shown in FIG. 4A, the masses of the gyroscope 300 generally correlate to the components of the gyroscope with like numbering, e.g., drive masses 402*a* and 402*b* are equivalent to drive masses 302*a* and 302*b*, respectively, driven masses 404*a* and 404*b* of the out-of-plane proof masses are equivalent in structure and operation to driven masses 304*a* and 304*b*, and sense masses 406*a* and 406*b* of the out-of-plane proof masses are equivalent in structure and operation to sense masses 306*a* and 306*b*. The kinematic couplings are not specifically called out and depicted in FIGS. 4A-4D but will be understood to operate similarly as in FIGS. 3A-3D, while a single coupling link 408 is depicted to include the various components of the coupling link as described in FIGS. 3A-3D.

Referring now to FIG. 4B, the gyroscope 400 includes drive masses 402*a* and 402*b*, which impart drive motion in the x-axis to respective driven masses 404*a* and 404*b*. The drive masses 402*a* and 402*b* are each additionally coupled to in-plane proof masses 412*a*, 412*b* via hinged coupling arms 410*a* and 410*b*. More specifically, in the example illustrated drive mass 402*a* is coupled to a hinged coupling arm 410*a*, and drive mass 402*b* is similarly coupled to hinged coupling arm 410*b*. The coupling arms 410*a* and 410*b*, as illustrated, may be rigid links that are each caused to rotate about their respective hinges by the drive masses 402*a* and 404*b*. The rotational motion of the coupling arms 410*a* and 410*b* causes a translational drive motion of the in-plane proof masses 412*a* and 412*b* in a direction perpendicular to the drive motion of the drive masses 402*a* and 402*b*, i.e., in the y-direction as shown in FIG. 4B. The in-plane proof masses 412*a* and 412*b* are configured to move out-of-plane (e.g., along the z-direction) in anti-phase to each other in response to a rotation about the x-axis, as indicated by "+" and "−". Furthermore, a proof mass 414*a* is coupled between each of the in-plane proof masses 412*a* and 412*b*, causing a rotational drive motion of the proof mass 414*a*. Accordingly, the proof mass 414*a* provides a third in-plane proof mass in the gyroscope 400, which is coupled between the first in-plane proof mass 412*a* and the second in-plane proof mass 412*b*. The in-plane proof mass 414*a* rotates about an out-of-plane axis (e.g., the z-axis) in response to the anti-phase drive motion of the first in-plane proof mass 412*a* and the second in-plane proof mass 412*b*. The in-plane proof mass 414*a* also moves out-of-plane in response to an angular velocity about a second axis perpendicular to the first axis (e.g., the y-axis).

The gyroscope 400, as discussed above, imparts a drive motion to a first drive mass, i.e., drive mass 402*a* in a first direction along a first axis, i.e., the x-axis. Additionally, a drive motion in anti-phase is imparted to a second drive mass, i.e., drive mass 402*b* parallel to the first axis. One or more in-plane proof masses are coupled to the first drive mass 402*a* and the second drive mass 402*b* and driven in a second direction different from the first direction. In the example illustrated in FIG. 4B, as discussed above, in-plane proof masses 412*a* and 412*b* are each driven in the y-direction and/or perpendicular to the first drive motion. An additional proof mass 414*a* is rotated by the drive motion of the in-plane proof masses 412*a* and 412*b*. Additionally, as illustrated in FIG. 4B, the out of plane proof masses, i.e., the driven masses 404*a* and 404*b* and sense masses 406*a* and 406*b*, are each located adjacent to the first in-plane proof mass, i.e., proof mass 412*b*.

As also discussed above, the gyroscope 400 incorporates components of gyroscope 300, and as such includes two out-of-plane proof masses driven in the x-direction. More specifically, a first out-of-plane proof mass is provided by driven mass 404*a* and sense mass 406*a*, while a second out-of-plane proof mass is provided by driven mass 404*b* and sense mass 406*b*. Each of these out-of-plane proof masses are driven in a x-direction perpendicular to that of the first drive motion of in-plane proof masses 412*a* and 412*b* (i.e., along the y-direction) and are responsive to an angular velocity about an out-of-plane axis (e.g., the z-axis in FIG. 4B) to cause respective y-direction Coriolis forces perpendicular to the first drive motion and in anti-phase to each other. Further, coupling link 408 causes the first out-of-plane proof mass (i.e., sense mass 406*a*) and the second out-of-plane proof mass (i.e., sense mass 406*b*) to reject a linear vibration and a rotational vibration as discussed above. Additionally, as discussed above a compliance of coupling link 408 may be relatively stiff, such that compliance to movement of the sense masses 406 may be relatively low. In an example, the stiffness of the coupling link 408 may be such that a natural frequency of the sense masses 406 and coupling link 408 facilitates resistance of the sense masses 406 to common mode disturbances imparted by other drive components of gyroscope 400, e.g., as may result from drive motion of proof masses 412, and results in any residual common mode forces being at a different (e.g., higher) frequency that is distinguishable from the differential mode sense frequency.

Referring now to FIG. 4C, an exemplary balanced multi-axis MEMS gyroscope 401 with a coupled drive system is illustrated and described in further detail, in accordance with an embodiment of the present disclosure. Generally, the gyroscope 401 includes the gyroscope 400 described above, with mirrored structure 450 duplicating the example structure of gyroscope 400. Gyroscope structures 400 and 450 are coupled in a mirror arrangement about a line of symmetry 472, with a coupling spring 470 between adjacent in-plane proof masses 412*a* and 462*a* of the two gyroscope structures. Additionally, second gyroscope structure 450 is identical to first gyroscope structure 400, except that the drive systems thereof move in anti-phase to that of the first gyroscope structure 400. Components of the second gyroscope structure 450 corresponding to those of the first gyroscope structure 400 are indicated with a reference number increased by 50. The coupling spring 470 synchronizes translation of adjacent in-plane proof mass 412*a* of gyroscope structure 400 with in-plane proof mass 462*a* of gyroscope structure 450. In this manner, drive systems for each of the gyroscope structures 400 and 450 work in opposite directions, thereby causing rotational forces associated with the drive systems and sensing motion to be further balanced or cancelled out. In this example, the coupling spring 470 extends along the line of symmetry 472, although it will be understood that other coupling spring configurations may be used consistent with this disclosure.

Accordingly, in the gyroscope 401, the drive masses 452*a* and 452*b* are third and fourth drive masses, which are mirrored about the symmetry line 472 with respect to the first drive mass 402*a* and 402*b*, respectively. Further, a fourth, fifth, and sixth in-plane proof mass is established by the in-plane proof mass 462*b*, 462*a*, and 464*a*, which are mirrored about the symmetry line with respect to the in-plane proof mass 412*b*, 412*a*, and 414*a*, respectively. Additionally, third and fourth out-of-plane proof masses are provided by the driven mass 454*a* and sense mass 456*a* and the driven mass 454*b* and sense mass 456*b*, which are also mirrored about the symmetry line 472 with respect to the first out-of-plane proof mass (i.e., driven mass 404*a* and sense mass 406*a*) and the second out-of-plane proof mass (i.e., driven mass 404*b* and sense mass 406*b*), respectively. The mirrored structures 400 and 450 provide for additional rotational and translational balancing of drive torque, and any external vibration forces that are coupled to the drive torque. In an example of only one of the gyroscope structure 400 or 450 alone, drive forces are balanced (their sum is zero) but their torque may not be (e.g., there is a net amount of torque applied by the drive to the gyro, due to the fact that drive forces on 402*a* are along a different line than drive forces on 402*b*). The combination of 400 and 405 in a mirrored configuration results not only in a zero force, but also zero overall torque.

For example, the in-plane proof masses 414*a* and 464*a* will experience offsetting and countervailing translational and rotational movements in response to both desired (e.g., drive and sense motion) and undesired (e.g., lateral and rotational vibrations) forces. Similarly for the overall linear and rotational motion of the linearly driven in-plane proof masses and coupling arms, the overall linear and rotational motions of these components of MEMS structure 400 (e.g., including in-plane proof masses 412*a* and 412*b* and coupling arms 410*a* and 410*b*, rotating about respective hinges) and MEMS structure 450 (e.g., including in-plane proof masses 462*a* and 462*b* and coupling arms 460*a* and 460*b*, rotating about respective hinges) counteract each other, whether due to desired or undesired forces. The out-of-plane sensing systems of MEMS structure 400 (e.g., driven masses 404*a* and 404*b*, sense masses 406*a* and 406*b*, and coupling link 408) and MEMS structure 450 (e.g., driven masses 454*a* and 454*b*, sense masses 456*a* and 456*b*, and coupling link 458) are each independently robust to both translational and rotational vibrations, and as such do not contribute any unbalance to the system as a whole.

Figure 5:
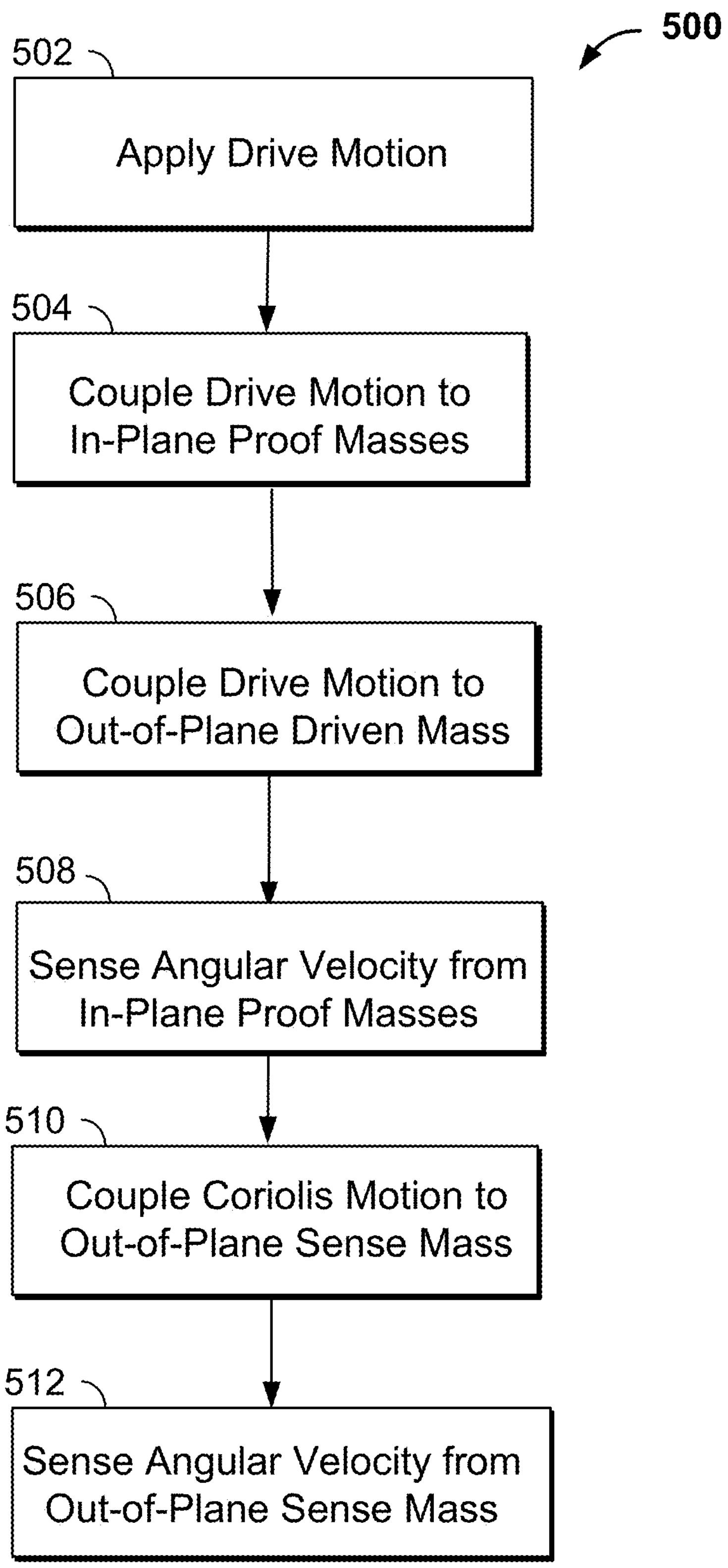
FIG. 5 depicts exemplary steps of assembling an exemplary multi-axis MEMS gyroscope with a balanced z-axis drive and sense system in accordance with an embodiment of the present disclosure.

FIG. 5 depicts an example process 500 of operating a balanced multi-axis MEMS gyroscope (e.g., gyroscope 300, 400, or 401 described above), in accordance with an embodiment of the present disclosure. Although steps or blocks of process 500 are depicted in a certain order for FIG. 5, this is an example and not limiting. For example, steps may be removed, modified, or substituted, and additional steps may be added in certain embodiments, and in some embodiments, the order of certain steps may be modified.

Process 500 may begin at block 502, where a drive system is provided configured to apply a drive motion, e.g., via one or more drive electrodes located adjacent to masses of any of gyroscopes 300, 400, or 401. For example, drive electrodes may drive multiple masses in anti-phase along an in-plane direction (e.g., the x-axis direction as depicted herein). The process may then continue to block 504.

At block 504, a drive motion may be coupled to one or more in-plane proof masses, e.g., one or more of in-plane proof masses 412*a*, 412*b*, 414*a*, 462*a*, 462*b*, 464*a*. In some embodiments, the drive motion be directly imparted on some of the in-plane proof masses such as by drive electrodes, while in other embodiments a drive mass may be directly driven by drive electrodes and transfer the drive motion to the in-plane proof masses. The in-plane proof masses may be driven in a second direction different from the first direction, e.g., perpendicular to the x-direction. In embodiments with in-plane proof masses that have perpendicular drive motions, a first linear drive motion (e.g., along the x-direction) may be translated to the perpendicular drive direction, such as via drive linkages, lever arms, and combinations thereof. Each of the in-plane proof masses moves in anti-phase with another in-plane proof mass, with the drive motion synchronized via a coupling system such as lever arms. The respective drive couplings are configured in a manner such that an angular momentum of the components associated with a first in-plane sense axis (e.g., y-axis) balances with the angular momentum of the components associated with a second in-plane sense axis (e.g., x-axis), based on anti-phase clockwise and counterclockwise rotation of the respective components. Process 500 may then proceed to block 506.

At block 506, a drive motion, e.g., as described in block 504, may be coupled to first and second out-of-plane proof masses, which in turn may include multiple interconnected masses (e.g., each out-of-plane proof mass including a driven mass and a sense mass). The drive motion may be in-plane and each out-of-plane proof mass may move in anti-phase with the another out-of-plane proof mass. Accordingly, driven masses (e.g., driven masses 304, 404, and/or 454) are driven via a connection to a drive mass or an in-plane proof mass, while the sense masses are not driven. The first and second out-of-plane proof masses may be driven in anti-phase to each other, and may each be responsive to an angular velocity about an out-of-plane axis to cause a respective in-plane Coriolis forces perpendicular to the drive motion of the first and second out-of-plane proof masses, respectively. Process 500 may then proceed to block 508.

At block 508, angular velocity may be sensed via one or more in-plane proof masses. For example, for the y-axis proof masses, a Coriolis force may be generated based on the anti-phase in-plane rotational movement of the proof masses and an angular velocity about the y-axis, resulting in anti-phase movement of the proof masses out of plane in the positive z-axis and negative z-axis directions. For the x-axis proof masses, a Coriolis force may be generated based on the anti-phase y-direction drive movement of the proof masses and an angular velocity about the x-axis, resulting in anti-phase movement of the proof masses out of plane in the positive z-axis and negative z-axis directions, based on the direction of the y-axis drive and the direction of rotation about the x-axis. These movements in response to Coriolis forces may be sensed, for example, by planar electrodes located on a substrate on a plane parallel to the device plane (e.g., on a substrate below the drive plane). Process 500 may then proceed to block 510.

At block 510, a Coriolis motion may be coupled to the out-of-plane sense masses. For example, a Coriolis force may be generated on the out-of-plane driven masses based on the anti-phase x-direction drive movement of the driven masses and an angular velocity about the z-axis, resulting in anti-phase movement of the driven masses in-plane in the positive y-axis and negative y-axis directions, based on the direction of the y-axis drive and the direction of rotation about the z-axis. This Coriolis force is then transferred to the out-of-plane sense masses, causing an anti-phase oscillation of the out-of-plane sense masses. This sense motion may in turn be coupled such as via a central coupling system. Further, as discussed above, first and second out-of-plane proof masses may be coupled with a coupling link configured to cause the first out-of-plane proof mass and the second out-of-plane proof mass to reject a linear vibration and a rotational vibration. Process may then proceed to block 512.

At block 512, an angular velocity may be sensed based on the anti-phase movement of the out-of-plane sense masses due to the Coriolis force. For example, drive electrodes may be located adjacent to each of the drive masses in the device plane to sense the movement of the sense masses. To the extent that common mode forces are experienced by the out-of-plane sense masses, those signals are at a different frequency from the differential sense motion, and as such, can be distinguished such as by digital or analog filtering.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A microelectromechanical system (MEMS) gyroscope, comprising:

a first drive mass that is driven in a first direction along a first axis;

a second drive mass that is driven parallel to the first axis in anti-phase to the first drive mass;

at least one in-plane proof mass coupled to the first drive mass and the second drive mass, wherein the at least one in-plane proof mass is driven in a second direction different from the first direction;

a first out-of-plane proof mass coupled to the first drive mass to be driven in a first drive motion in the first direction and responsive to an angular velocity about an out-of-plane axis to cause a first in-plane Coriolis force perpendicular to the first drive motion;

a second out-of-plane proof mass coupled to the second drive mass to be driven in a second drive motion in anti-phase to the first drive motion and responsive to the angular velocity about the out-of-plane axis to cause a second in-plane Coriolis force in anti-phase to the first in-plane Coriolis force; and a coupling link between the first out-of-plane proof mass and the second out-of-plane proof mass, wherein the coupling link causes the first out-of-plane proof mass and the second out-of-plane proof mass to reject a linear vibration and a rotational vibration.

2. The MEMS gyroscope of claim 1, wherein a first center of mass of the first out-of-plane proof mass when moving in response to the first in-plane Coriolis force is aligned with a second center of mass of the second out-of-plane proof mass in response to the second in-plane Coriolis force.

3. The MEMS gyroscope of claim 1, wherein the first out-of-plane proof mass comprises a first driven mass and a first sense mass, the second out-of-plane proof mass comprises a second driven mass and a second sense mass, and wherein the coupling link is connected between the first sense mass and the second sense mass.

4. The MEMS gyroscope of claim 3, wherein:

the first driven mass is driven by the first drive motion and moves in response to the first in-plane Coriolis force in a first sense motion;

the first sense mass is connected to the first driven mass such that the first sense mass is not driven by the first drive motion but moves according to the first sense motion;

the second driven mass is driven by the second drive motion and moves in response to the second in-plane Coriolis force in a second sense motion;

the second sense mass is connected to the second driven mass such that the second sense mass is not driven by the second drive motion but moves according to the second sense motion; and the coupling link synchronizes an out-of-phase movement of the first sense mass and the second sense mass due to the first sense motion and the second sense motion.

5. The MEMS gyroscope of claim 4, wherein the coupling link rejects the rotational vibration such that the first sense mass and the second sense mass do not move in response to the rotational vibration.

6. The MEMS gyroscope of claim 5, wherein the first sense motion and the second sense motion are sensed by differential sensing, wherein the linear vibration is in a vibration direction corresponding to one of the first sense motion or the second sense motion, and wherein the coupling link synchronizes a movement due to the linear vibration such that a common mode output due to the linear vibration is rejected.

7. The MEMS gyroscope of claim 1, wherein the coupling link rejects the rotational vibration based on restricting movement of the first out-of-plane proof mass and the second out-of-plane proof mass due to the rotational vibration.

8. The MEMS gyroscope of claim 1, wherein the coupling link rejects the linear vibration based on coupling movement of the first out-of-plane proof mass and the second out-of-plane proof mass to a common mode.

9. The MEMS gyroscope of claim 8, wherein the common mode is at a different frequency than a frequency of a differential mode of the first out-of-plane proof mass and the second out-of-plane proof mass.

10. The MEMS gyroscope of claim 8, wherein the common mode is stiffer than anti-phase movement due to the first in-plane Coriolis force and the second in-plane Coriolis force.

11. The MEMS gyroscope of claim 1, wherein the at least one in-plane proof mass comprises a first in-plane proof mass and a second in-plane proof mass, wherein each of the first in-plane proof mass and the second in-plane proof mass is coupled to the first drive mass and the second drive mass, wherein the second direction is perpendicular to the first direction and the first in-plane proof mass and the second in-plane proof mass are driven in anti-phase by the first drive mass and the second drive mass, and wherein the first in-plane proof mass and the second in-plane proof mass move out-of-plane in anti-phase in response to a rotation about the first axis.

12. The MEMS gyroscope of claim 11, further comprising a third in-plane proof mass coupled between the first in-plane proof mass and the second in-plane proof mass, wherein the third in-plane proof mass rotates about the out-of-plane axis in response to the anti-phase drive motion of the first in-plane proof mass and the second in-plane proof mass, and wherein the third in-plane proof mass moves out-of-plane in response to an angular velocity about a second axis perpendicular to the first axis.

13. The MEMS gyroscope of claim 12, further comprising:

a first coupling arm located between the first drive mass and the first in-plane proof mass and second in-plane proof mass; and a second coupling arm located between the second drive mass and the first in-plane proof mass and second in-plane proof mass.

14. The MEMS gyroscope of claim 13, wherein the first coupling arm rotates about a first hinge point based on movement of the first drive mass and the second coupling arm rotates in anti-phase to the first coupling arm about a second hinge point based on movement of the second drive mass.

15. The MEMS gyroscope of claim 12, wherein the first out-of-plane proof mass and the second out-of-plane proof mass are each located adjacent to the first in-plane proof mass.

16. The MEMS gyroscope of claim 15, further comprising:

a third drive mass mirrored about a symmetry line with respect to the first drive mass and that is driven in anti-phase to the first drive mass;

a fourth drive mass mirrored about the symmetry line with respect to the second drive mass and that is driven in anti-phase to the second drive mass;

a fourth in-plane proof mass mirrored about the symmetry line with respect to the second in-plane proof mass and driven in-phase with the second in-plane proof mass;

a fifth in-plane proof mass mirrored about the symmetry line with respect to the first in-plane proof mass and driven in-phase with the first in-plane proof mass;

a sixth in-plane proof mass mirrored about the symmetry line with respect to the third in-plane proof mass and driven rotationally in anti-phase with the third in-plane proof mass;

a third out-of-plane proof mass mirrored about the symmetry line with respect to the first out-of-plane proof mass and driven in anti-phase with the first out-of-plane proof mass; and a fourth out-of-plane proof mass mirrored about the symmetry line with respect to the second out-of-plane proof mass and driven in anti-phase with the second out-of-plane proof mass.

17. The MEMS gyroscope of claim 16, further comprising a coupling spring connecting the second in-plane proof mass to the fourth in-plane proof mass.

18. The MEMS gyroscope of claim 17, wherein the coupling spring extends along the symmetry line.

19. The MEMS gyroscope of claim 16, wherein the third out-of-plane proof mass and the fourth out-of-plane proof mass are each located adjacent to the fifth in-plane proof mass.

20. A method of operating a microelectromechanical system (MEMS) gyroscope, comprising:

providing a drive system comprising a first drive mass and a second drive mass, wherein the first drive mass is driven in a first direction along a first axis, and the second drive mass is driven parallel to the first axis in anti-phase to the first drive mass;

coupling at least one in-plane proof mass to the first drive mass and the second drive mass, wherein the at least one in-plane proof mass is driven in a second direction different from the first direction;

coupling a first out-of-plane proof mass to the first drive mass such that the first out-of-plane proof mass is driven in a first drive motion in the first direction and is responsive to an angular velocity about an out-of-plane axis to cause a first in-plane Coriolis force perpendicular to the first drive motion;

coupling a second out-of-plane proof mass to the second drive mass such that the second out-of-plane proof mass is driven in a second drive motion in anti-phase to the first drive motion, wherein the second out-of-plane proof mass is responsive to the angular velocity about an out-of-plane axis to cause a second in-plane Coriolis force in anti-phase to the first in-plane Coriolis force; and coupling the first out-of-plane proof mass and the second out-of-plane proof mass with a coupling link configured to cause the first out-of-plane proof mass and the second out-of-plane proof mass to reject a linear vibration and a rotational vibration.

* * * * *